(12) United States Patent
Ewing, III (10) Patent No.: US 6,554,171 B1
(45) Date of Patent: Apr. 29, 2003

(54) GOLF BAG RACK ATTACHABLE TO VEHICLE HITCH

(76) Inventor: Melvin A. Ewing, III, 2995 Indian Oaks Dr., Lincoln, CA (US) 95648

( * ) Notice: Subject to any disclaimer, the term of this patent is extended or adjusted under 35 U.S.C. 154(b) by 0 days.

(21) Appl. No.: 10/005,449

(22) Filed: Nov. 6, 2001

(51) Int. Cl.[7] ................................................. B60R 9/00
(52) U.S. Cl. ...................... 224/521; 211/85.7; 224/274; 224/519
(58) Field of Search ................................. 224/521, 274, 224/504, 516, 519, 523, 525, 531, 532; 211/13.1, 85.7

(56) References Cited

U.S. PATENT DOCUMENTS

| | | | |
|---|---|---|---|
| 1,493,828 A | | 5/1924 | Stocks |
| 3,985,171 A | | 10/1976 | Summers |
| 4,061,257 A | | 12/1977 | St. Clair |
| 4,337,882 A | | 7/1982 | Hampton |
| 4,533,013 A | | 8/1985 | Hightower |
| 5,056,695 A | * | 10/1991 | Gilblet ...................... 190/18 A |
| 5,092,503 A | * | 3/1992 | Cocks ......................... 224/508 |
| 5,224,636 A | * | 7/1993 | Bounds ....................... 224/281 |
| 5,368,209 A | * | 11/1994 | Hill ............................. 224/402 |
| 5,460,304 A | * | 10/1995 | Porter et al. ................. 224/485 |
| 5,727,642 A | * | 3/1998 | Abbott ........................ 180/6.5 |
| 5,806,738 A | | 9/1998 | D'Angelo |
| 5,853,278 A | * | 12/1998 | Frantz ......................... 224/504 |
| D409,557 S | | 5/1999 | Armour |
| 6,039,227 A | | 3/2000 | Stark |
| 6,148,999 A | | 11/2000 | Olson |
| D437,578 S | * | 2/2001 | Stannard-Warne ......... D12/406 |
| 6,427,854 B1 | * | 8/2002 | Grossi et al. ............... 211/85.7 |

OTHER PUBLICATIONS

Golfins; Golfins Bag Travel System; "http://www.golfins.com" internet website.

* cited by examiner

Primary Examiner—Stephen K. Cronin
Assistant Examiner—Maerena W. Brevard
(74) Attorney, Agent, or Firm—Heisler & Associates (57) ABSTRACT

A rack 10 is provided which is removably attachable to a vehicle V through a hitch receiver and can support multiple golf bags G thereon. The rack 10 includes a tongue 30 which can pass directly into a hitch receiver on the vehicle V or through an intervening adapter 20. A mast 40 extends up from the tongue 30. A cross bar 50 extends horizontally from an upper end 42 of the mast 40. The mast 40 and cross bar 50 are configured to support an upper portion of golf bags G which are carried upon the rack 10. The cross bar 50 preferably can be extended or collapsed as necessary to provide support for a varying number of golf bags G upon the rack 10. A beam 70 is pivotably attached to the mast 40 adjacent the tongue 30. The beam 70 pivots between two orientations including a substantially horizontal orientation and a substantially vertical orientation. A central platform 90 is supported upon the beam 70. Two side platforms 100 are slidably supported relative to the beam 70. When the side platforms 100 are slid away from the central platform 90 each of the side platforms 100 and the central platform 90 can support a separate golf bag G, so that three golf bags G can be supported upon the rack 10. When the side platforms 100 are adjacent a central platform 90 one or two golf bags G can be supported upon the platforms 90, 100 in a balanced fashion relative to a center line of the rack 10.

27 Claims, 6 Drawing Sheets

GOLF BAG RACK ATTACHABLE TO VEHICLE HITCH

FIELD OF THE INVENTION

The following invention relates to racks attachable to vehicles which are adapted to carry golf bags thereon. More particularly, this invention relates to racks which attach to vehicles through a hitch receiver and which can carry both golf bags alone or golf bag and hand pull cart assemblies with a variable number of golf bags borne by the rack and with the rack being adjustable in both width and depth.

BACKGROUND OF THE INVENTION

To play the game of golf, a player must first travel with golf clubs to the location of the golf course, typically requiring travel of significant distances upon vehicle roadways. The size of most golf bags is sufficiently great that most vehicles cannot carry as many golf bags as passengers. This disparity is particularly great when wheeled hand pull carts are attached to the golf bags. For instance, a typical four to six seat sedan style vehicle has a trunk which cannot easily accommodate more than two golf bags with attached hand pull carts. While perhaps additional golf bags could be forced into the vehicle trunk, the resulting risk of damage to golf clubs and vehicle makes such attempts inadvisable.

Patents to Stark (U.S. Pat. No. 6,039,227), D'Angelo (U.S. Pat. No. 5,806,738) and Armour (D409,557) each teach golf club racks which attach to hitch receivers of a vehicle and which are configured to carry one or two golf bags thereon. These prior art golf bag racks are deficient in a number of important respects. First, they are not capable of carrying more than two golf bags thereon so that the vehicle is still potentially capable of carrying more passengers than golf bags. Second, these prior art golf bag racks include rimed bases which restrict the size of golf bag which may be placed upon the golf bag rack, excluding the possibility of supporting both the golf bag and an attached hand pull cart. Third, when these prior art golf bag racks are utilized to carry a single golf bag they do not readily accommodate placement of that single golf bag in a balanced fashion along a center line of the rack. Fourth, they are not in any way collapsible when not in use and so pose a hazard to the driver which might be otherwise mitigated. Fifth, the prior art golf bag racks are limited in their ability to secure the golf bag to the rack. They typically include only a single strap or chain near an upper portion of the golf bag, such that a risk of the golf bag bouncing unnecessarily or becoming dislodged from the rack is created.

Accordingly, a need exists for a golf bag rack which can attach to the vehicle and flexibly accommodate up to three golf bags and attached hand pull carts in a secure fashion. Such a rack would beneficially be collapsible in width when a fewer number of bags are being supported and collapsed in depth when not in use.

SUMMARY OF THE INVENTION

This invention provides a golf bag rack which is attachable to a vehicle through a hitch receiver extending from the vehicle. The rack includes a tongue which is secured directly to the hitch receiver. The tongue is preferably sized to match a larger 2 inch size standard hitch receiver and the rack includes an adapter to allow the tongue to be securely fixed to a smaller 1¼ inch size standard vehicle hitch receiver.

A rigid mast preferably extends vertically up from the tongue. The mast includes an elongate cross bar which extends horizontally away from an upper end of the mast. The cross bar is configured to include straps which can secure in an adjustable fashion to an upper portion of golf bags placed adjacent the cross bar. The cross bar is preferably expandable in lateral width so that a spacing between outboard golf bags or golf bag and hand pull cart assemblies can be accommodated.

The rack includes a base which is pivotably attached to the mast of the rack. The base preferably is made up of three platforms including a central platform and two side platforms. The side platforms are slidably attached to the central platform along an under bar secured to a beam beneath the central platform. The beam includes fingers and a pivot pin which pivotably attach the beam, and hence the entire base, to the mast. The base can thus be pivoted between a first substantially horizontal orientation when the base is to be used to support golf bags thereon and a second substantially vertical orientation when the rack is not in use.

When the side platforms are laterally spaced away from the central platform the central platform and side platforms can together accommodate three golf bag and hand pull cart assemblies adjacent each other. Straps on the side platforms and the central platform secure lower portions of the golf bag and hand pull cart securely to the base.

When the side platforms are slid into position adjacent the central platform, two golf bags and hand pull cart assemblies can be supported adjacent each other and resting partially upon each of the side platforms and partially upon the central platform. The cross bar can be decreased in length to a minimum width which provides straps conveniently where desired for such a two bag configuration for the rack.

When one golf bag and hand pull cart is to be carried, the one golf bag and hand pull cart rest upon the central platform with straps on the central platform securing a lower portion of the golf bag and with a top strap on the mast securing an upper portion of the golf bag. Hence, when either one, two or three golf bags and hand pull carts are supported upon the rack the rack maintains lateral balance relative to a center line of the rack.

OBJECTS OF THE INVENTION

Accordingly, a primary object of the present invention is to provide a golf bag rack which is attachable to a hitch receiver of a vehicle and can support at least one golf bag thereon.

Another object of the present invention is to provide a golf bag rack which can support one, two or three golf bags thereon.

Another object of the present invention is to provide a golf bag rack which can accommodate up to three golf bag and hand pull cart assemblies thereon.

Another object of the present invention is to provide a golf bag rack which is collapsible to have a minimum depth when not in use.

Another object of the present invention is to provide a golf bag rack which is adjustable in width to keep the rack with a width similar to a width of the golf bags being supported upon the rack.

Another object of the present invention is to provide a golf bag rack which is lightweight.

Another object of the present invention is to provide a golf bag rack which has various different components securely and rigidly coupled together and with sufficient strength to support three of the heaviest conceivable golf bag and hand pull cart assemblies.

Another object of the present invention is to provide a golf bag rack which can be easily assembled and disassembled for shipping and storage and which can be easily attached and detached from a vehicle having either a standard 2 inch hitch receiver or a smaller 1¼ inch hitch receiver.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIG. 1) is directed to a rack configured to support one or more golf bags G thereon and attachable to a vehicle V, such as through a hitch receiver of the vehicle V. The rack 10 can hold one, two or three golf bags G (FIGS. 1–3) according to the preferred embodiment with each configuration keeping the golf bags G combined center of mass aligned with a vertical center line of the rack 10. The rack 10 can accommodate golf bags G either alone or in combination with a wheeled hand pull cart. The rack 10 is configured to allow width expansion and contraction (FIGS. 5 and 6) so that the rack 10 maintains an appropriate width for the number of golf bags G carried by the rack 10. The rack 10 can be pivoted into a reduced depth configuration when not in use (FIG. 7).

Figure 1:
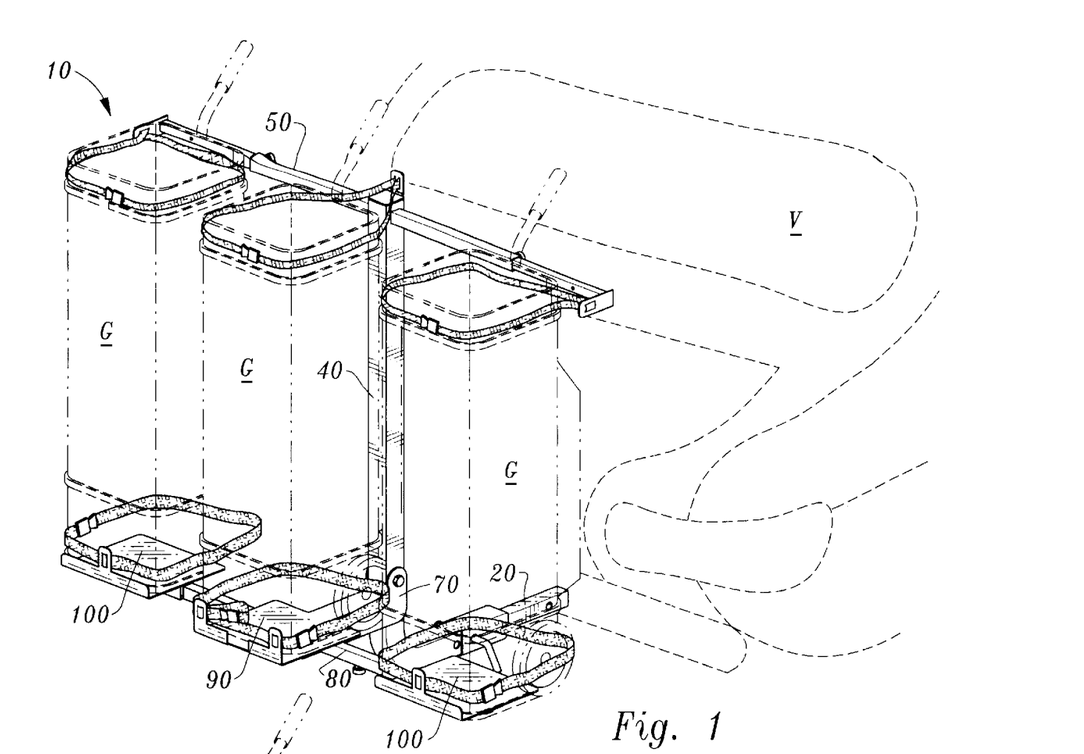
FIG. 1 is a perspective view of the golf bag rack of this invention in an expanded width configuration with three golf bags and hand pull carts attached to the golf bag rack and with the golf bag rack coupled to a rear of a vehicle.
Figure 2:
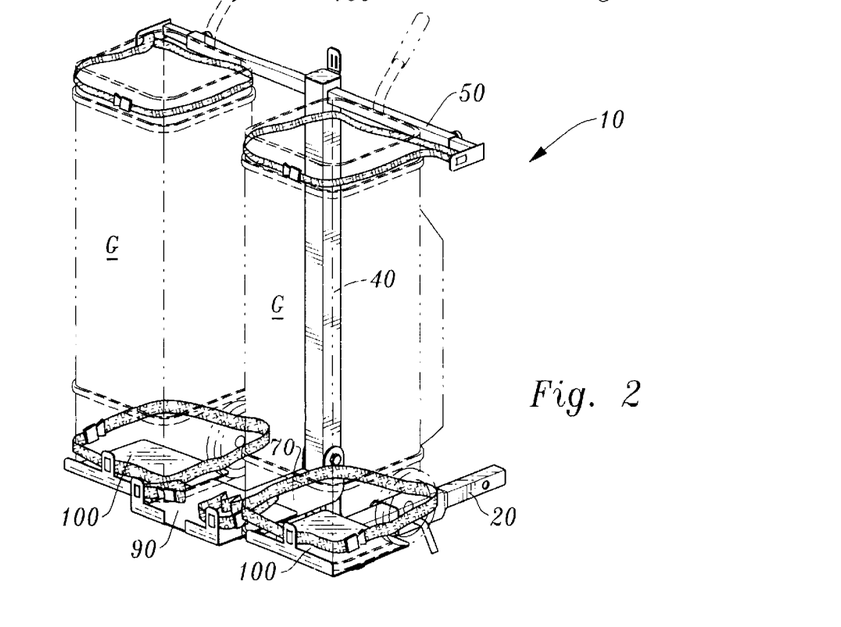
FIG. 2 is a perspective view of the golf bag rack of this invention in a collapsed width configuration for supporting two golf bags and hand pull carts upon the golf bag rack.
Figures 3, 4:
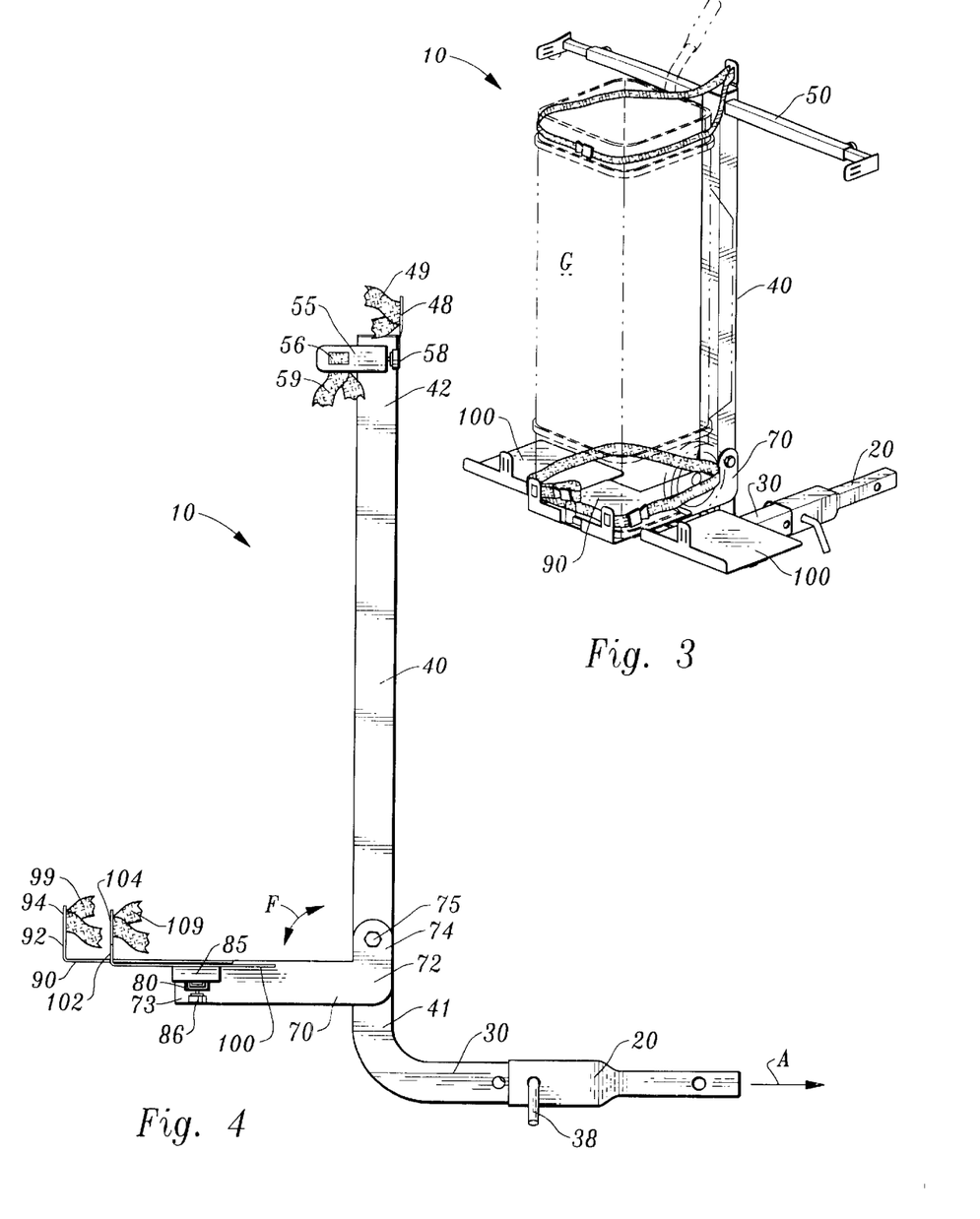
FIG. 3 is a perspective view of the golf bag rack of this invention in a single golf bag and hand pull cart configuration.
FIG. 4 is a side elevation view of that which is shown in FIGS. 1–3.

In essence, and with particular reference to FIGS. 1–3, the basic features of the golf bag rack 10 are described. An adapter 20 (FIG. 8) is optionally provided to allow a tongue 30 of the rack 10 to be mounted into a hitch receiver of the vehicle V even if the hitch receiver is of a 1¼ inch smaller standard size. The tongue 30 securely attaches either to the adapter 20 or to a 2 inch larger standard size hitch receiver of the vehicle V. The tongue 30 preferably extends substantially horizontally until it transitions into the substantially vertical mast 40 (FIG. 4) extending up from the tongue 30. The mast 40 supports a cross bar 50 (FIG. 6) near an upper end 42 of the mast 40. The cross bar 50 is configured to extend horizontally perpendicular to the mast 40 and perpendicular to the tongue 30. The cross bar 50 is adjustable in length to accommodate a varying number of golf bags G of varying widths supported by the rack 10.

A beam 70 (FIGS. 4 and 7) is pivotably attached to a lower portion of the mast 40. The beam 70 preferably pivots about a horizontal axis with the beam 70 remaining within a center line of the rack 10. The beam 70 includes an under bar 80 extending horizontally perpendicular to the beam 70. The beam 70 has a central platform 90 fixed to a top surface of the beam 70. Two side platforms 100 are slidably attached to the under bar 80 (FIG. 6) in positions substantially coplanar with the central platform 90. The side platforms 100 can thus slide between positions adjacent the central platform 90 to positions spaced from the central platform 90, depending on the number of golf bags G to be supported upon the platforms 90, 100.

The beam 70, under bar 80, central platform 90 and side platforms 100 together form a base of the rack 10 which supports the golf bags G resting upon the platforms 90, 100. When the beam 70 is pivoted from a horizontal orientation to a vertical orientation (FIG. 7) the entire base of the rack 10 pivots into a substantially vertical plane and a depth of the rack 10 is decreased, such as when the rack 10 is not in use supporting golf bags G.

Figure 8:
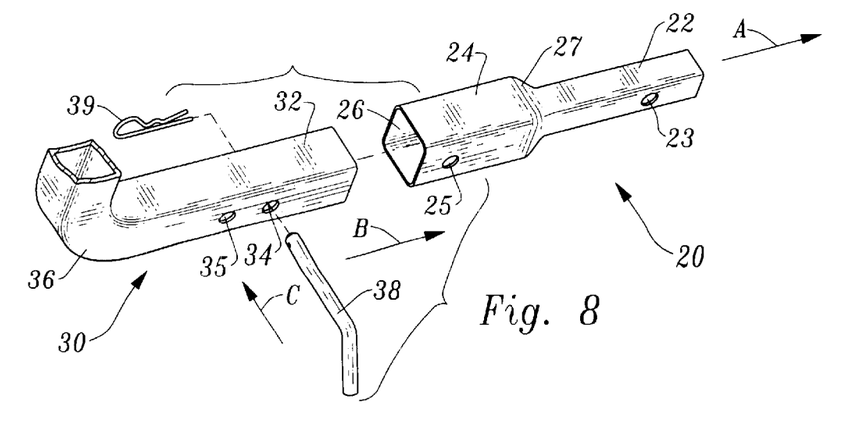
FIG. 8 is a perspective view of an adapter and tongue of this invention which facilitates attachment of the golf bag rack to either a standard 2 inch hitch receiver or a smaller 1¼ inch hitch receiver.

More specifically, and with particular reference to FIG. 8, details of the adapter 20 and tongue 30 of the rack 10 are described. The adapter 20 is provided to allow the tongue 30 to preferably be sized for a 2 inch larger standard hitch receiver and still allow the tongue 30 to be securely coupled to a 1¼ inch smaller standard hitch receiver through the adapter 20. The adapter 20 is preferably a rigid construct having a substantially square cross-section and a hollow central bore 26. The adapter 20 includes a small end 22 with holes 23 passing laterally through the small end 22. The holes 23 are spaced from the small end 22 by a distance appropriate to allow a pin to secure the small end 22 of the adapter 20 within a 1¼ inch smaller standard hitch receiver when inserted into such a receiver (along arrow A of FIG. 8).

The adapter 20 additionally includes a large end 24 opposite the small end 22. Holes 25 pass through the adapter 20 adjacent the large end 24. The holes 25 are spaced from the large end 24 by a distance appropriate to allow the tongue 30 to pass into the bore 26 of the adapter 20 and have a pin 38 secure the tongue 30 within the bore 26 of the adapter 20. A taper 27 defines a transition zone where the adapter 20 transitions from the cross-section of the large end 24 to the cross-section of the small end 22.

The tongue 30 is preferably a rigid construct formed as a unitary mass together with the mast 40. The tongue 30 can alternatively be a separate component with the mast 40 securely attachable to the tongue 30. The tongue 30 preferably has a substantially square cross-section sized slightly smaller than the bore 26 of the adapter 20 so that the tongue 30 can extend (along arrow B of FIG. 8) into the bore 26 of the adapter 20.

The tongue 30 includes a tip 32 which passes into and out of the bore 26 of the adapter 20. The tip 32 can also fit within a 2 inch larger standard hitch receiver coupled to the vehicle V (FIG. 1). The tongue 30 includes forward holes 34 and rearward holes 35 passing laterally through the tongue 30 near the tip 32. The forward holes 34 are closer to the tip 32 than the rearward holes 35. The forward holes 34 have an appropriate spacing from the tip 32 to allow the pin 38 to pass through the forward holes 34 (along arrow C of FIG. 8) when the tip 32 of the tongue 30 is located within the bore 26 of the adapter 20. The rearward holes 35 are spaced from the tip 32 appropriately to allow the pin 35 to secure the tip 32 of the tongue 30 within a 2 inch larger standard hitch receiver directly. A retainer 39 is provided to secure the pin 38 within either the forward holes 34 or the rearward holes 35. The tongue 30 includes a bend 36 at an end of the tongue opposite the tip 32 where the tongue 30 transitions into the mast 40.

With particular reference to FIGS. 4–7, details of the mast 40 are described. The mast 40 is preferably a rigid construct having a cross-sectional contour similar to the tongue 30 and formed along with the tongue 30. The mast 40 includes a lower end 41 directly above the bend 36 in the tongue 30. The mast 40 extends up from the lower end 41 to an upper end 42. Preferably, a height of the mast 40 between the lower end 41 and the upper end 42 is similar to a typical height of a golf bag G (FIGS. 1–3). The mast 40 preferably has a hollow core 43 to increase a strength to weight ratio of the mast 40. The upper end 42 is preferably closed with a cap 45.

Top holes 46 of preferably square shape pass laterally through the mast 40 just below the upper end 42. The top holes 46 have a size which allows the cross bar 50 to pass through the top holes 46. The cross bar 50 is preferably of square cross-section so that the cross bar 50 is prevented from rotating within the top holes 46 when the cross bar 50 is located passing through the mast 40 (along arrow H of FIG. 10).

The mast 40 additionally includes a top tab 48 with a pair of slits 47 passing therethrough. A top strap 49 is threaded through the slits 47 in the top tab 48. This top strap 48 provides one form of a retainer to secure one or more golf bags G to the rack 10. Typically, an upper portion of a single golf bag G (FIG. 3) or a middle one of three golf bags G (FIG. 1) is secured by the top strap 48. Other means to secure an upper portion of the golf bag G to the rack 10 could similarly be provided including elastic straps, chains, golf bag G hood structures, or fasteners of any type (i.e. hooks, snaps, etc.) to secure the golf bag G directly to the the rack 10. Preferably, the top strap 49 is sufficiently long to gird the golf bag G and is adjustable in length to tightly hold the upper portion of the golf bag G (and optionally an associated hand pull cart) adjacent the mast 40 (FIG. 3).

Figure 5:
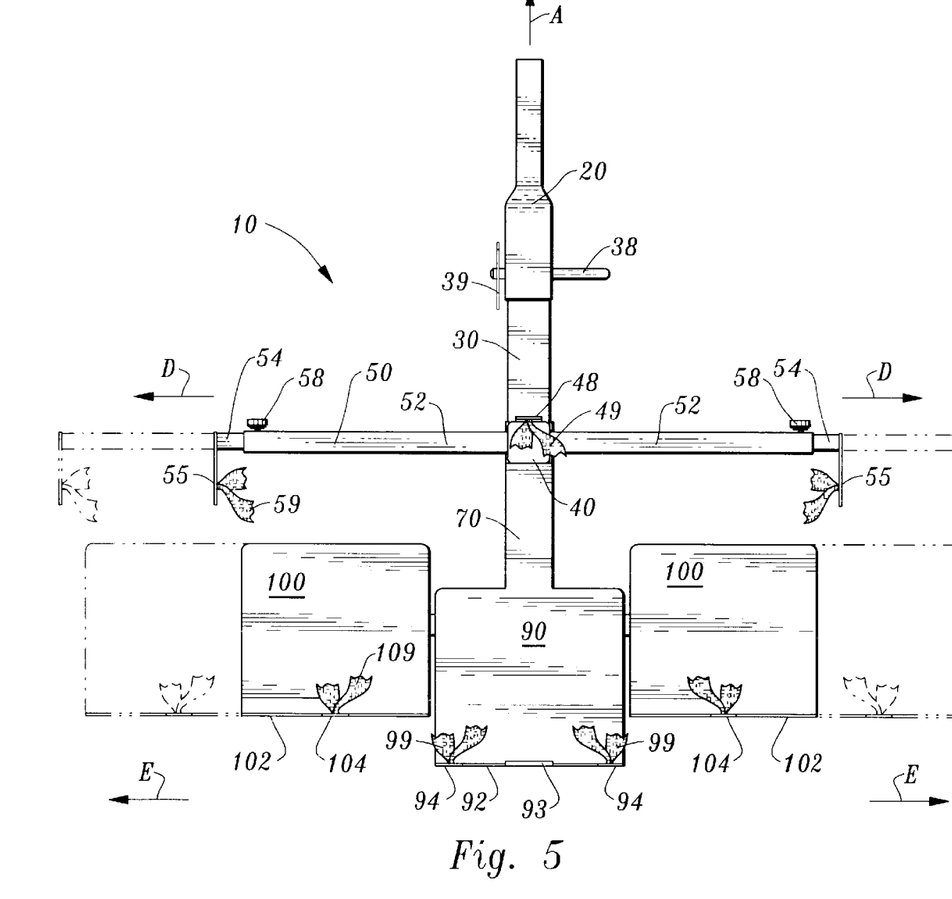
FIG. 5 is a top plan view of that which is shown in FIGS. 1–3.
Figure 6:
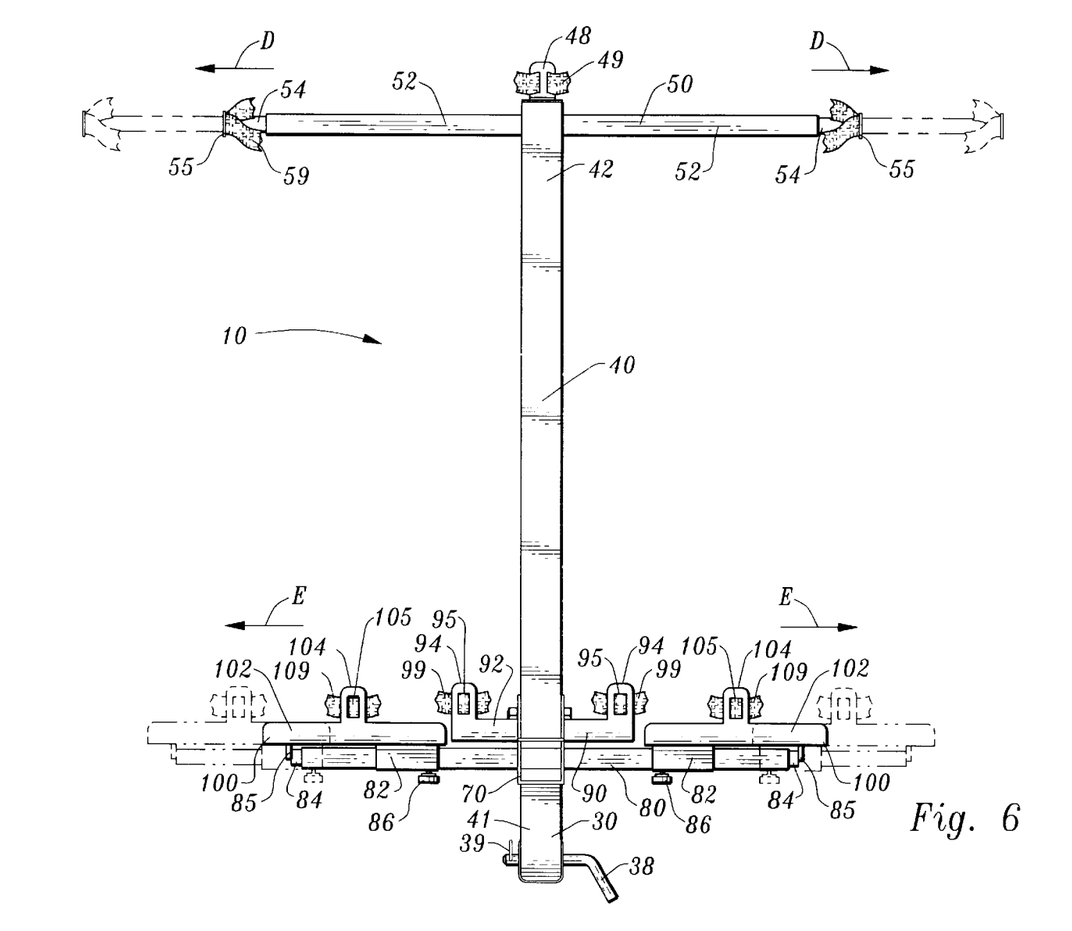
FIG. 6 is a rear elevation view of that which is shown in FIGS. 1–3.
Figure 7:
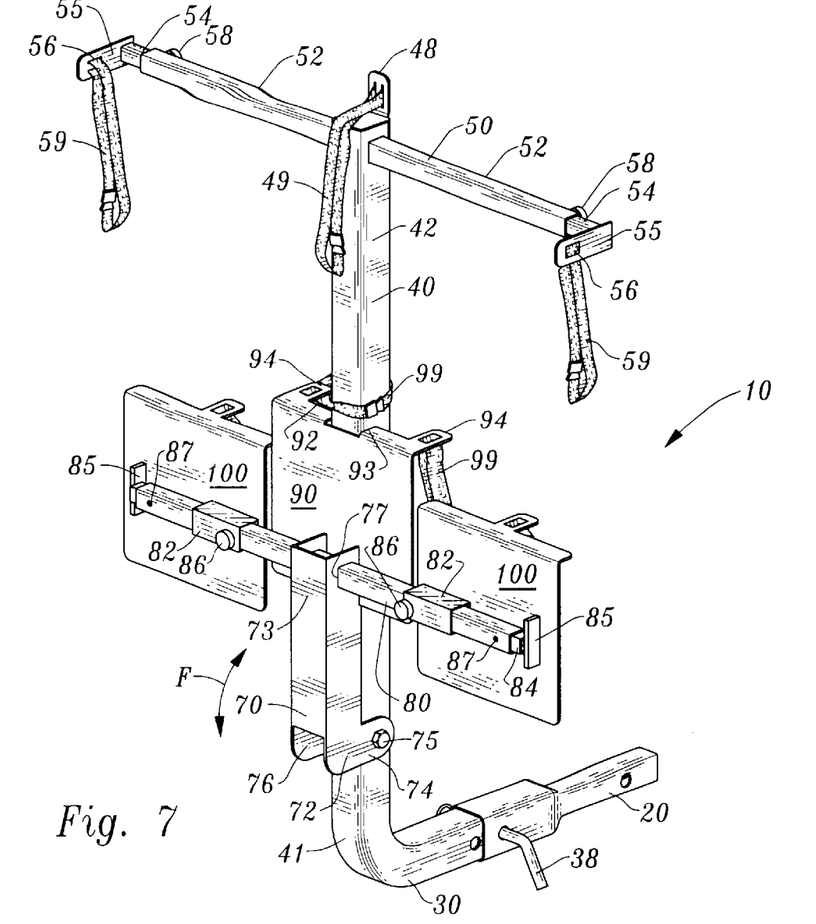
FIG. 7 is a perspective view of the golf bag rack of this invention in an unloaded and collapsed configuration with the base of the golf bag rack in a second orientation pivoted up into a vertical position adjacent a mast of the golf bag rack and with the golf bag rack exhibiting a minimum depth.

With particular reference to FIGS. 5–7, details of the cross bar 50 are described. The cross bar 50 is preferably an elongate assembly of elements including a center segment 52 and two end segments 54. The center segment 52 preferably extends horizontally through the top holes 46 (FIGS. 9 and 10) and the mast 40 along a line perpendicular to the tongue 30 of the rack 10. The center segment 52 preferably has a size which is less than the mast 40 and similar to that of the top holes 46 so that the center segment 52 is prevented from relative motion with the mast 40.

The end segments 54 are preferably slightly smaller in cross-section than the center segment 52 and the center segment 52 is preferably hollow so that the end segments 54 can nest and slide in a telescoping manner (along arrow D of FIGS. 5 and 6) within the center segment 52.

The end segments 54 include end tabs 55 at extremities thereof. Slits 56 are formed in the end tabs 55 and lateral straps 59 are threaded through the slits 56. Preferably, the lateral straps 59 are configured similar to the top strap 49 of the mast 40. The lateral straps 59 are primarily utilized when two or three golf bags G are attached to the rack 10 (FIGS. 1 and 2) to secure upper portions of the outboard golf bags G to the rack 10.

Knobs 58 with threaded shafts included thereon coact with holes in the center segment 52 and threaded holes in the end segments 54 to secure the end segments 54 to the center segment 52 when properly positioned. As an alternative, the knobs 58 can have spring biased pins extending therefrom to align holes in the center segment 52 with holes in the end segments 54. In one form of the invention, the end segments 54 can be free of holes and the holes in the center segment 52 can be threaded so that friction between the threaded shaft on the knobs 58 holds the end segments 54 in place. Alternatively, friction enhancing tips or covers can be provided on the threaded shaft of the knobs 58 to help secure the end segments 54 relative to the center segment 52.

Most preferably, each desired position for the end segments 54 relative to the center segment 52 are selected and defined by providing threaded holes at appropriate locations passing through the end segments 54 so that they can be aligned with holes in the center segment 52 with the threaded shaft coupled to the knobs 58 passing through the holes in the center segment 52 and the end segments 54 to secure the end segments 54 relative to the center segment 52.

Figure 9:
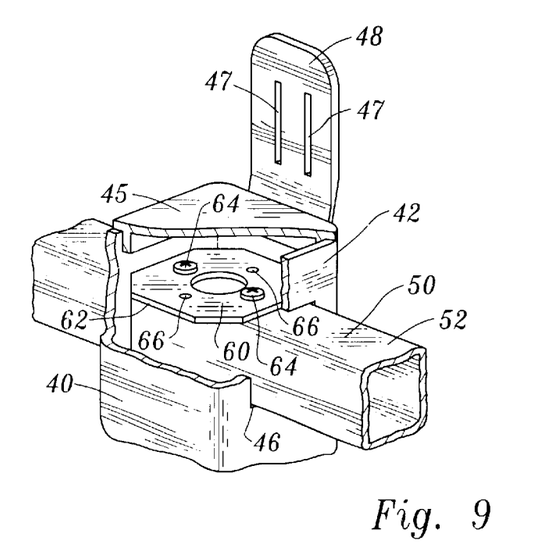
FIG. 9 is a perspective view of an upper end of a mast of the golf bag rack of this invention with portions cut away to reveal how a cross bar of the golf bag rack is secured to the mast.
Figure 10:
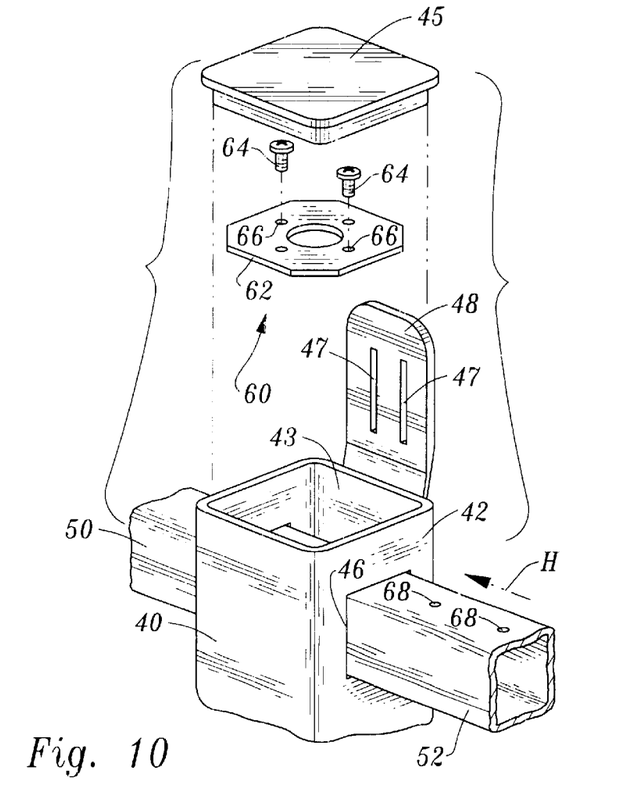
FIG. 10 is a perspective exploded parts view of that which is shown in FIG. 9.

With particular reference to FIGS. 9 and 10, details of a top plate 60 are described. To facilitate greater collapsibility for shipping and storage, the cross bar 50 is preferably configured to be removably but securely coupled to the mast 40. The top plate 60 is provided as a preferred structure to secure the cross bar 50 in proper position passing through the mast 40. Specifically, the top plate 60 is provided with a perimeter 62 which closely matches a cross-section of the hollow core 43 of the mast 40. While the hollow core 43 preferably has a square cross-section, any constant size and shape cross-section would be effective. Screws 64 can be passed through holes 66 in the top plate 60 and then thread into threaded holes 68 in the cross bar 50 when the cross bar 50 has been located (along arrow H of FIG. 10) at a central position.

When the screws 64 are appropriately positioned through the holes 66 and threaded into the threaded holes 68, the top plate 60 is secured to the cross bar 60. The cross bar 60 is then held in position relative to the mast 40 so that no rotation, translation or other relative movement can occur between the cross bar 50 and the mast 40. The cap 45 covers the top plate 60 and keeps moisture and debris from entering the hollow core 43 of the mast 40.

With particular reference to FIGS. 4, 6 and 7, details of the beam 70 are described. The beam 70 is a rigid construct which is preferably pivotably attached to the mast 40 near the lower end 41 of the mast 40 and supports the platforms 90, 100 and other portions of the base of the rack 10 in a pivotable fashion relative to the mast 40. The beam 70 is preferably formed to have a generally square cross-section slightly larger than the cross-section of the mast 40 and tongue 30. A front end 42 of the beam 40 includes fingers 74 which preferably extend vertically up from the front end 72 of the beam 70. A pivot pin 75 is supported passing through the fingers 74 so that the fingers 74 pivotably attach the front end 72 of the beam 70 to the mast 40. A slot 76 passes between the fingers 74 of the front end 72 of the beam 70. The slot 76 has a width similar to a width of the mast 40 with the slot 76 accommodating rotation of the beam 70 (along arrow F of FIGS. 4 and 7) between a first horizontal orientation and a second vertical orientation. Alternatively, the orientations of the beam 70 and hence the orientations of other portions of the base of the rack 10 could be various different non-horizontal or non-vertical orientations.

The beam 70 includes a back end 73 opposite the front end 72. The back end 73 includes back holes 77 passing laterally through the beam 70. The back holes 77 support the under bar 80 passing therethrough in a rigid fashion.

With particular reference to FIGS. 6 and 7, details of the under bar 80 are described. The under bar 80 is preferably an elongate rigid construct having a square cross-section sized similar to a size of the back hole 77 in the beam 70. In this way, the under bar 80 can be oriented passing through the back hole 77 and in a substantially horizontal orientation perpendicular to the tongue 30.

The under bar 80 provides a track upon which two slides 82 coupled to the side platforms 100 can translate. The under bar 80 is preferably hollow and extensions 84 preferably extend out of ends of the under bar 80. The extensions 84 are secured to the side platforms 100 through end ties 85. The end ties 85 attach to ends of the extensions 84 most distant from the under bar 80.

Knobs 86 allow rotation of threaded shafts or control of motion of spring biased pins to allow the slides 82 to securely engage the under bar 80 when the slides 82 are positioned where desired relative to the under bar 80. Holes 87 (FIG. 7) are provided in the under bar 80 at positions where the slides 82 are desired to have secure attachment to the under bar 80. The slides 82 are preferably fixedly attached to the side platforms 100 so that both the slides 82, extensions 84, end ties 85 and knobs 86 all move along with the side platforms 100 in a sliding fashion relative to the under bar 80 (along arrows E of FIGS. 5 and 6).

While the under bar 80 provides a preferred means to slidably attach the side platforms 100 relative to the central platform 90 and the beam 70, the side platforms 100 could alternatively be slidably connected directly to the central platform 90 or be slidably supported with other mechanisms (i.e. rails, tracks, grooves, slots, etc.) providing the same slidable support function.

With particular reference to FIGS. 5–7, details of the central platform 90 and side platforms 100 are described. The central platform 90 is preferably fixedly attached directly to the beam 70, such as by welding the planar central platform 90 directly to the beam 70. The central platform 90 has a size sufficient to support at least a portion of a golf bag G thereupon. The central platform 90 includes a back lip 92 extending vertically up from a rear edge of the central platform 90. A notch 93 is formed in the back lip 92 which has a width similar to a width of the mast 40. Hence, when the central platform 90 and other portions of the base of the rack 10 are pivoted up into the vertical second orientation (along arrow F of FIG. 7) the notch 93 allows the central platform 90 to abut directly against the mast 40.

A pair of back tabs 94 preferably extend up from the back lip 92. Each back tab 94 preferably includes two slits 95 passing therethrough with straps 99 threaded through the slits 95. The straps 99 are preferably configured similar to the top straps 49 and lateral straps 59 of the mast 40 and cross bar 50. The straps 99 can thus be utilized to secure a bottom portion of one or more golf bags G resting upon the central platform 90 or the adjacent side platforms 100 of the base.

The side platforms 100 each have a first position adjacent the central platform 90 and a second position spaced from the central platform 90. The side platforms 100 are preferably sufficiently large to support at least a portion of a golf bag G thereupon. Each side platform 100 preferably includes a back lip 102 extending up from a rear portion of the side platforms 100. Preferably, other edges of the side platforms 100 and the central platform 90 are lipless. In this way, portions of the golf bag G, and particularly portions of a wheeled hand pull cart which extend away from the golf bag G, can be allowed to extend down below a level of the side platforms 100 somewhat and the central platform 90 somewhat.

Each back lip 102 preferably includes a central tab 104 extending upward with a pair of slits 105 in the central tab 104. A strap 109 is threaded through the slits 105 in each central tab 104. Straps 109 preferably have a configuration similar to the straps 99 of the central platform 90. The straps 109 can thus be utilized to secure outboard golf bags G to the side platforms 100.

In use and operation, the rack 10 is preferably utilized as follows. Initially, if the rack 10 has been partially disassembled for storage or shipping, the cross bar 50 needs to be attached to the upper end 42 of the mast 40. The cross bar 50 is passed through the top holes 46 (along arrow H of FIG. 10) until the threaded holes 68 in the cross bar 50 are facing upwardly within the hollow core 43 of the mast 40. The top plate 60 is then dropped down into the hollow core 43 until the holes 66 in the top plate 60 are aligned with the threaded holes 68 in the cross bar 50. Screws 64 can then be utilized to secure the top plate 60 to the cross bar 50 and hence secure the cross bar 50 to the mast 40. The cap 45 can then be placed over the hollow core 43 at the upper end 42 of the mast 40.

If the base of the rack 10 has been removed from the mast 40, the pivot pin 75 is aligned to pass through the fingers 74 and the mast 40 so that the base of the rack 10 is pivotably attached to the mast 40. The rack 10 is then ready to be attached to the vehicle V (FIG. 1).

Initially, the user determines what size hitch receiver is coupled to the vehicle V. If the hitch receiver is a 1¼ inch smaller standard hitch receiver, the adapter 20 (FIG. 8) is utilized. Specifically, the small end 22 of the adapter 20 is oriented within the hitch receiver (by travel along arrow A of FIG. 8). A pin is then passed through the holes 23 in the adapter 20 and through the hitch receiver to secure the adapter 20 to the hitch receiver.

The tongue 30 then has its tip 32 nested within the bore 26 in the adapter 20 (along arrow B of FIG. 8) and the pin 38 passed through the forward holes 34 in the tongue 30 (along arrow C of FIG. 8) and through the holes 25 in the adapter 20 to secure the tongue 30 to the adapter 20.

If the hitch receiver is a 2 inch larger standard hitch receiver, the adapter 20 is not utilized and the tongue 30 has its tip 32 nested directly into the hitch receiver. The pin 38 is then passed through the rearward holes 35 and through holes in the hitch receiver to secure the tongue 30 directly to the hitch receiver of the vehicle V.

The rack 10 is now securely mounted to the vehicle V. A user then determines how many golf bags G are to be supported upon the rack 10. If three golf bags G (and optionally associated hand pull carts) are to be carried, the rack 10 is configured as shown in FIG. 1. Specifically, the end segments 54 of the cross bar 50 are extended laterally (along arrows D of FIGS. 5 and 6) and the knobs 58 utilized to secure the end segments 54 in the extended configuration. The side plates 100 are laterally extended (along arrows E of FIGS. 5 and 6) and the knobs 86 utilized to secure the side platforms 100 in their spaced position away from the central platform 90.

Each golf bag G (and optionally attached hand pull cart) is then placed on either the central platform 90 or one of the two side platforms 100. The top strap 49 and lateral straps 59 are utilized to secure upper portions of the golf bags G to the cross bar 50 and mast 40. The straps 99 and straps 109 are utilized to secure lower portions of the golf bags G to the central platform 90 and side platforms 100. The vehicle V can now be driven with the three golf bags G securely mounted upon the rack 10.

If two golf bags G are to be supported upon the rack 10, the end segments 54 of the cross bar 50 are preferably kept in their collapsed configuration and the side platforms 100 are kept in their adjacent positions relative to the central platform 90. The two golf bags G are placed partially upon the side platforms 100 and partially upon the central platform 90.

Various different straps 49, 59 can be utilized to secure upper portions of the two golf bags G to the cross bar 50 and mast 40. Various different straps 99, 109 can be utilized to secure lower portions of the two golf bags G to these side platforms 100 and central platform 90. The vehicle V is then ready to be driven with the two golf bags G secured to the rack 10.

If only one golf bag G is to be supported upon the rack 10, the cross bar 50 is kept in its collapsed configuration and the side platforms 100 are kept in their position adjacent the central platform 90. The one golf bag G is placed upon the central platform 90 with the top strap 49 utilized to secure an upper portion of the golf bag G to the mast 40. The straps 99 are utilized to secure a lower portion of the golf bag G to the central platform 90. The vehicle V can then be driven with the one golf bag G securely attached to the rack 10 (FIG. 3).

If no golf bags G are to be supported upon the rack 10, a depth of the rack 10 and extent to which the rack 10 extends beyond the rear of a vehicle V can be decreased. The base of the rack 10 including the beam 70, under bar 80, central platform 90 and side platforms 100 are pivoted (about arrow F of FIGS. 4 and 7) into a second vertical orientation adjacent the mast 40. At least one of the straps 99 can be utilized to hold the base of the rack 10 adjacent the mast 40. The vehicle V can now be driven with the rack 10 providing minimal interference with the vehicle V.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment.

What is claimed is:

1. A golf bag rack removably attachable to a rear of a vehicle with a hitch receiver, the rack comprising in combination:

a tongue configured to attach to the hitch receiver of the vehicle;

at least one platform coupled to said tongue;

said platform having a first orientation and a second orientation, said first orientation closer to horizontal than said second orientation; and wherein a mast is rigidly coupled to said tongue and extends substantially vertically up from said tongue, said mast including means to attach to at least one golf bag resting upon said at least one platform.

2. The rack of claim 1 wherein said attachment means includes a flexible strap coupled to said mast.

3. A golf bag rack removably attachable to a rear of a vehicle with a hitch receiver, the rack comprising in combination:

a tongue configured to attach to the hitch receiver of the vehicle;

at least one platform coupled to said tongue;

said platform having a first orientation and a second orientation, said first orientation closer to horizontal than said second orientation;

wherein said at least one platform includes means to attach to a golf bag resting upon said at least one platform; and wherein said attachment means includes at least one flexible strap coupled to said platform.

4. A golf bag rack removably attachable to a rear of a vehicle with a hitch receiver, the rack comprising in combination:

a tongue configured to attach to the hitch receiver of the vehicle;

at least one platform coupled to said tongue;

said platform having a first orientation and a second orientation, said first orientation closer to horizontal than said second orientation;

wherein said at least one platform is pivotably coupled to other portions of said rack such that said at least one platform pivots between said first orientation and said second orientation; and wherein a mast extends substantially vertically up from said tongue, said mast including a means to attach to a golf bag resting upon said at least one platform.

5. The rack of claim 4 wherein said mast and said tongue are formed together from a single rigid unitary piece of material with a bend between said tongue and said mast, said tongue oriented substantially horizontally and said mast oriented substantially vertically.

6. The rack of claim 4 wherein a beam is fixed to said at least one platform, said beam pivotably attached to said mast.

7. The rack of claim 6 wherein said beam includes a slot therein with fingers on either side of said slot and a pivot pin passing through said mast and through each of said fingers of said beam on either side of said slot, said slot having a width at least as great as a width of said mast.

8. The rack of claim 4 wherein said platform includes a back lip extending perpendicularly from adjacent portions of said platform, said back lip including a notch in a central portion thereof, said notch having a width at least as great as a width of said mast, said notch in said back lip oriented adjacent said mast when said at least one platform is placed in said second orientation.

9. A golf bag rack removably attachable to a rear of a vehicle with a hitch receiver, the rack comprising in combination:

a tongue configured to attach to the hitch receiver of the vehicle;

at least one platform coupled to said tongue;

said platform having a first orientation and a second orientation, said first orientation closer to horizontal than said second orientation; and wherein said rack includes at least three platforms including a central platform and two side platforms slidably attached to said central platform, each said platform including at least one means to attach to a golf bag resting upon at least one of said platform.

10. The rack of claim 9 wherein a mast is fixed to said tongue and extends vertically up from said tongue, said mast having a crossbar fixedly attached to an upper end of said mast opposite said tongue, said cross bar including a plurality of means to attach to a golf bag resting upon one of said platforms.

11. The rack of claim 9 wherein said cross bar extends substantially horizontally perpendicular to said mast and perpendicular to said tongue, said cross bar having a variable length.

12. The rack of claim 10 wherein said cross bar includes a center segment fixed to said mast and two end segments which telescope axially relative to said center segment and out of ends of said center segment.

13. The rack of claim 9 wherein said plurality of means to attach to a golf bag resting upon at least one of said platforms includes a flexible strap fixed to each end of each segment of said cross bar.

14. The rack of claim 12 wherein said mast has a hollow core with a substantially constant cross-section and wherein a top plate is provided having a perimeter of similar size and shape to said cross-section of said hollow core, such that said top plate can reside within said hollow core, said mast including top holes horizontally spaced from each other and aligned to allow said center segment of said cross bar to pass through said top holes of said mast, said cross bar including threaded holes therein and said top plate including holes therein which align with said threaded holes in said cross bar such that screws included with said top plate can pass through said holes in said top plate and into said threaded holes of said cross bar to secure said top plate to said cross bar and secure said center segment of said cross bar in a fixed position relative to said mast.

15. An adjustable width golf bag carrier for carrying a variable number of golf bags laterally spaced in a balanced fashion by a rear hitch receiver of a vehicle, the carrier comprising in combination:
a tongue configured to attach to the hitch receiver of the vehicle; and
a base coupled to said tongue, said base including at least one platform, said base having a variable width to accommodate a variable number of golf bags or golf bag and hand pull cart assemblies upon said base.

16. The carrier of claim 15 including a mast coupled to said tongue and extending substantially vertically up from said tongue, said mast including at least one retainer for an upper portion of a golf bag or golf bag and hand pull cart assembly.

17. The carrier of claim 16 wherein a number of retainers on said mast equals a number of golf bags accommodated by said base.

18. The carrier of claim 17 wherein said at least one retainer includes a substantially horizontal cross bar fixed to said mast and at least one flexible strap attached to said cross bar.

19. The carrier of claim 15 wherein said base includes a central platform and at least two side platforms slidably coupled to said central platform in a fashion allowing lateral sliding of said side platforms from a first position adjacent said central platform to a second position more distant from said central platform.

20. The carrier of claim 19 wherein said first position of said side platforms accommodates either one centrally positioned golf bag or golf bag and hand pull cart assembly, or two adjacent golf bags or golf bag and hand pull cart assemblies; and
wherein said second position accommodates three golf bags or golf bag and hand pull cart assemblies laterally spaced from each other resting upon said platforms of said base.

21. The carrier of claim 20 wherein each said platform includes a back lip extending up from each said platform, and wherein sides of said central platform and said side platforms are lipless.

22. The carrier of claim 21 wherein a beam is fixed to said central platform, said beam including an under bar rigidly attached to said beam, said side platforms slidably attached to said under bar such that said side platforms can extend laterally toward and away from said central platform upon said under bar;
wherein said beam is pivotably attached to said tongue such that said base including said central platform, said side platforms, said beam and said under bar can pivot relative to said tongue between a first orientation and a second orientation with said first orientation more horizontal than said second orientation, said beam including a slot with fingers on either side of said slot, said slot having a width at least as great as a mast extending up from said tongue, said fingers having a pivot pin passing therethrough and through said mast such that said beam pivots about said pivot pin; and
wherein said back lip includes a notch therein at a location where said back lip abuts said mast when said base is oriented in said second orientation with said back lip adjacent said mast.

23. The carrier of claim 15 wherein said base is pivotably attached to said tongue, such that said at least one platform has a first orientation and a second orientation, said first orientation closer to horizontal than said second orientation.

24. A method for attaching a variable number of golf bag and hand pull cart assemblies to a vehicle through a hitch receiver, including the steps of:
providing a rack including a tongue configured to attach to the hitch receiver of the vehicle, at least one platform coupled to the tongue, and a mast coupled to the tongue and the platform and extending up from the tongue, the mast including at least one retainer for an upper portion of the golf bag and hand pull cart assembly;
placing at least one golf bag and hand pull cart assembly on the at least one platform; and
securing an upper portion of the golf bag and hand pull cart assembly to an upper end of the mast through the retainer.

25. The method of claim 24 including the further steps of providing a pivotable attachment between the platform and the mast; and
pivoting the platform between a first orientation and a second orientation, the first orientation closer to horizontal than the second orientation.

26. The method of claim 24 including the steps of providing the rack with at least three platforms including a central platform and at least two side platforms, the central platform and the at least two side platforms each oriented in a substantially common plane, the side platforms slidably coupled to the central platform; and
adjusting a distance between the side platforms to match a combined width of a set of assemblies to be placed upon the platforms.

27. The method of claim 26 including the further steps of:
providing a cross bar extending horizontally away from the mast and perpendicular to the horizontal tongue, the cross bar including the retainer thereon; and
adjusting a length of the cross bar to match a distance between outboard golf bag and hand pull cart assemblies placed upon the platforms.

* * * * *